United States Patent [19]

Brown et al.

[11] Patent Number: 4,594,170

[45] Date of Patent: Jun. 10, 1986

[54] METHOD FOR LIQUIFYING CHLORIDE-BASED HEAVY BRINE WELL COMPLETION FLUIDS

[75] Inventors: Richard A. Brown, Trenton; Robert D. Norris, Cranbury; Joseph C. Richards, Robbinsville, all of N.J.

[73] Assignee: FMC Corporation, Philadelphia, Pa.

[21] Appl. No.: 624,423

[22] Filed: Jun. 25, 1984

[51] Int. Cl.$^4$ .............................. C09K 7/00; C09K 7/04
[52] U.S. Cl. ............................... 252/8.55 R; 166/300; 423/513; 423/584; 210/759
[58] Field of Search .................... 166/291, 300; 252/8.55 R; 423/513, 584; 210/759

[56] References Cited

U.S. PATENT DOCUMENTS

| | | | |
|---|---|---|---|
| 2,767,167 | 10/1955 | Opie et al. | 260/209 |
| 3,061,599 | 10/1962 | De Vries et al. | 260/89.5 |
| 3,167,510 | 1/1965 | Alter | 252/8.55 |
| 3,193,464 | 7/1965 | Edman et al. | 167/88 |
| 3,324,017 | 6/1967 | Perry et al. | 204/159.24 |
| 3,378,444 | 4/1968 | Swanson | 167/88 |
| 3,648,774 | 3/1972 | Kirk | 166/305 R |
| 3,709,297 | 1/1973 | Christopher, Jr. et al. | 166/273 |
| 3,727,688 | 4/1973 | Clampitt | 166/283 |
| 3,779,914 | 12/1973 | Nimerick | 252/8.55 R |
| 3,816,151 | 6/1974 | Podias | 106/194 |
| 3,960,736 | 6/1976 | Free et al. | 252/8.55 R |
| 4,014,801 | 3/1977 | Fullinwider et al. | 252/8.55 D |
| 4,137,182 | 1/1979 | Golinkin | 252/8.55 R |
| 4,144,179 | 3/1979 | Chatterji | 252/8.55 R |
| 4,234,433 | 11/1980 | Rhudy et al. | 252/8.55 D |
| 4,250,044 | 2/1981 | Hinkel | 252/8.55 R |
| 4,292,191 | 9/1981 | Gray | 252/99 |
| 4,318,835 | 3/1982 | Clarke | 264/36 |
| 4,368,136 | 1/1983 | Murphey | 252/316 |
| 4,552,674 | 11/1985 | Brown et al. | 252/8.55 R |
| 4,552,675 | 11/1985 | Brown et al. | 252/8.55 R |

OTHER PUBLICATIONS

Allen et al., *Production Operations*, Oil & Gas Consultants, Inc., Tulsa, (1978), pp. 207-221.

Hudson et al., "Fluid Loss Control Through the Use of A Liquid-Thickened Completion and Workover Brine, *Journal of Petroleum Technology*, Oct. 1983, pp. 1776-1782.

*Primary Examiner*—Joseph L. Schofer
*Assistant Examiner*—F. M. Teskin
*Attorney, Agent, or Firm*—R. E. Elden; R. L. Andersen; E. G. Seems

[57] ABSTRACT

The invention provides a method to liquify a heavy brine completion fluid containing chlorides. The combination of a persulfate and hydrogen peroxide was found to be more effective than either compound alone, or than a peroxygen plus an activator.

6 Claims, No Drawings

METHOD FOR LIQUIFYING CHLORIDE-BASED HEAVY BRINE WELL COMPLETION FLUIDS

This invention relates to a method to liquify a chloride-based heavy brine well completion fluid having a density greater than 90 kg/m$^3$.

A completion fluid is one that is placed against a producing formation while conducting operations such as well killing, cleaning out, drilling in, plugging back, controlling sand, or perforating. The basic functions of a completion fluid are to facilitate movement of treating fluids to a particular point downhole, to remove solids from a well, and to control formation pressures.

Required completion fluid properties are known to vary depending on the formation and the specific use. Completion fluids are discussed in Allen et al, *Producer Operations*, Oil & Gas Consultants Incorporated, Tulsa (1978) pages 207 to 221, which is incorporated herein by reference. A large number of polymers are suitable to thicken or gel completion fluids. The selection of a polymer and the formulation of that polymer into a completion fluid is well within the capabilities of one skilled in the art as disclosed in Allen et al, supra and also in U.S. Pat. No. 4,137,182 to Gollinkin and in U.S. Pat. No. 4,144,179 to Chatterji. The latter two references are incorporated herein by reference.

Although it is generally preferred for the density of a completion fluid to be as low as possible, it is frequently necessary to use "heavy brines" with densities greater than about 90 kg/m$^3$. Chloride-based heavy brines typically contain high concentrations of salts such as sodium chloride, calcium chloride, and zinc chloride. Because of the high cost of such salts, their potential to damage a producing formation, and the environmental problems in disposing of the brines, it is important to recover and reuse heavy brines.

a completion fluid must not contain solides which would plug the producing formation. Consiequently, it is necessary to filter a completion fluid prior to reuse. However, the filtration of a viscous fluid or gel is very difficult, time-consuming, and expensive. It is well known that the viscosity of completion fluids can be reduced or "broken" particularly by the use of additives called "breakers." Peroxygen, such as persulfates, hydrogen peroxide, peracids and organic peroxides, are commonly used as breakers either alone or with accelerators and/or inhibitors U.S. Pat. No. 3,167,510 to Alter discloses that the efficacy of persulfate as a breaker is greater in fresh water-based completion fluids than in brine-based completion fluids. In heavy brines the efficacy of either hydrogen peroxide or a persulfate is so reduced that the time required to break the completion fluid is excessive, or alternatively, such large quantities of transition metal ions are required as accelerators that the brine is contaminated and unsuitable for reuse without purification.

It is an object of this invention to provide a method to liquify a completion fluid containing a chloride-based heavy brine having a density greater than about 90 kg/m$^3$ without the use of transition metal ions as accelerators.

In the present invention it has been unexpectedly found that the use of hydrogen peroxide together with a persulfate is more effective in liquifying a chloride-based heavy brine completion fluid than either hydrogen peroxide or a persulfate alone when used at the equivalent concentration.

The completion fluid may contain any suitable polymer conventionally used by one skilled in the art, such as a hydroxyethylcellulose, a xanthan gum, or any other natural or synthetic polymer capable of forming an aqueous gel.

Any persulfate is suitable for use. Desirably the persulfate is an alkali metal, ammonium or alkaline earth persulfate. Preferably the persulfate is a commercially-available persulfate, such as ammonium persulfate, sodium persulfate or potassium persulfate. The hydrogen peroxide may be incorporated in any convenient form, such as liquid hydrogen peroxide or as a solid capable of liberating hydrogen peroxide on solution, suitable solids capable of liberating hydrogen peroxide include sodium perborate, sodium carbonate peroxide, sodium pyrophosphate peroxide, sodium peroxide, and urea peroxide. Alternatively, the hydrogen peroxide may be generated in the completion fluid by well known means such as the cathodic reduction of oxygen.

While, of course, effective amounts of both the persulfate and the peroxide must be used, the quantities used are not critical. One skilled in the art will readily recongnize that it is desirable to minimize the overall cost of recovering and reusing the brines from a used copletion fluid. Consequently, the optimum mol ratio of hydrogen peroxide to persulfate, the hydrogen peroxide:persulfate mol ratio, may vary from 9:1 to 1:9. As hydrogen peroxide is usually less expensive than persulfate on a mol basis it is usually desirable for the hydrogen peroxide:persulfate mol ratio to be between 9:1 and 1:1.

There is no limit to the maximum quantity of peroxygens which can be used in breaking a completion fluid; however, economic considerations usually result in using the smallest quantity concomitant with the properties of the completion fluid and the time required. Usually a usage rate of less than 10 millimols of peroxygen per liter of completion fluid is desired. One skilled in the art will readily recognize that reducing the peroxygen usage will increase the time for the viscosity to drop to a desired value. As little as 1 millimol per liter of persulfate will result in a significant reduction in viscosity in 3 hours, therefore as little as one millimol of combined hydrogen peroxide and persulfate will be effective so that with a minimum of experimentation one skilled in the art can determine an effective usage rate under field conditions.

It is well known that the rate of a chemical reaction increases with temperature. The reaction temperature is not critical for the present invention and any temperature between the freezing temperature and boiling temperature of the completion fluid is satisfactory. One skilled in the art will adjust the concentration of the breaker system in the completion fluid to the temperature of the completion fluid in order to optimize the cost of liquifying the completion fluid in the desired time. It is desirable for the temperature of the completion fluid to be at least about 10° C.

Transition metal activators used either alone or with other additives are very effective in breaker systems for a completion fluid which does not contain a high halide concentration. However, in a high density, chloride-based completion fluid such activators have at best a marginal efficacy, particularly as it is usually necessary to remove the activators prior to reuse of the brine. With the present invention it is unnecessary to use such activator systems as a slight increase in the peroxygen usage is usually more cost effective on an overall basis than the use of activator systems.

The best mode now known for practicing the invention is illustrated by the following non-limiting examples; the results of which are discussed following the last-given example (Example 4). The abbreviation "mM" is used herein to express a concentration as millimolarity (millimols/liter).

EXAMPLE 1

A completion fluid was prepared containing a 119 kg/m$^3$ sodium chloride brine and adjusted to pH 6.5. After the addition of 0.6% hydroxyethylcellulose (HEC) the pH was increased to 7.5 and the fluid was permitted to stand overnight to thicken. Either hydrogen peroxide ($H_2O_2$) or ammonium persulfate (APS) were added as a breaker. Accelerator systems which were optionally added were copper ion (Cu) eithe alone or with amino tri(methylenephosphonic acid) (AMP), and a sulfite ion (sulfite). The completion fluid was adjusted to pH 9.5 and the viscosity was determined at intervals. All additives are reported in Table I as grams per 380 ml of completion fluid which is equivalent to pounds per barrel. The total peroxygens are also recorded as millimols/liter (mM). The viscosity reduction is reported in Table I as percent of original viscosity. Initially, dilute sulfuric acid and dilute sodium hydroxide were used for pH adjustments. Subsequently sodium carbonate was used instead of sodium hydroxide. Viscosity was determined using a Brookfield Model RVT viscometer using a No. 1 spindle at 10 rpm.

EXAMPLE 2

The experimental procedures of Example 1 were repeated based on a 139 kg/m$^3$ calcium chloride brine; the experimental conditions and results are presented in Table II.

EXAMPLE 3

The experimental procedures of Example 2 were repeated using a 132 kg/m$^3$ based on a sodium bromide brine; the experimental results are presented as Table III. Dilute hydrochloric acid and a lime slurry were used for pH control.

EXAMPLE 4

The suitability of the brines for reuse was demonstrated using a sodium chloride completion fluid used for Example 1 which was liquified using hydrogen peroxide alone. Similarly, a calcium chloride completion fluid used for Example 3 was liquified using the mixed hydrogen peroxide-sodium persulfate breaker of the present invention and filtered. Both solutions were colorless and free of solids by visual examination. The solutions were rethickened using the procedure in Example 1. The original viscosity of the solution and the viscostity after rethickening is reported in Table IV. In addition the viscosity was determined by an NL Industries Baroid rheometer at 300 rpm and 600 rpm. These viscosities are reported in arbitrary units: 1 unit being equivalent to 0.0488 kg/m$^2$.

Table I shows the results of various breaker systems in a sodium chloride 0.6% hydroxyethylcellulose completion fluid. The use of APS alone at a level of 0.2 g APS in 380 ml resulted in a slow and incomplete break (Run 1). Doubling the amount of APS resulted in marginally greater activity (Run 2). The use of metals (Run 3) and metals in combination with complexing and reducing agents (Run 4) with even higher levels of APS provided only a small increment of improvement. In non-brine systems, metal catalysis are known to dramatically accelerate gel breaking.

Hydrogen peroxide (Runs 7 and 8) was much more effective than APS. At the higher $H_2O_2$ level, viscosity reduction is rapid and complete, The lower level of $H_2O_2$ was made more effective by the addition of copper (Run 5) but sulfite (Run 6) had a small negative impact.

Surprisingly mixtures of APS and $H_2O_2$ show a synergistic effect. This synergism is evident in Run 10 which had the same total active oxygen (AO) content as Run 7 $H_2O_2$ alone) and Run 10 (APS alone). The reduction of viscosity of Run 10 was essentially the same as in Run 8 where the AO level was twice as high.

Table II shows the effect of various breaker systems in a $CaCl_2$ based completion fluid containing 0.6% HEC. In Runs 11–15, it was seen that APS alone (Run 11) did not provide a rapid break. A moe satisfactory break was obtained using APS in conjunction with a metal, complexing agent and reducing agent and reducing agent (Run 12–13). Hydrogen peroxide (Run 14), while more effective than APS, was not as effective as in the NaCl brine. A mixture of $H_2O_2$ and APS (Run 15) was the most effective system tested, it provided a very rapid and compete break while avoiding contamination of either the metal complexing agent, or the reducing agent.

Run 16–20 clearly demonstrate the synergistic effect of APS and $H_2O_2$. In Run 20 the break was much more rapid and complete than either Runs 17 or 19. The effect in Run 20 was more than the additive effects of Rund 16 and 18.

The use of peroxide/persulfate mixtures does not extend to bromide gels as shown in Table III. In fact, the mixture is somewhat worse than $H_2O_2$ alone and much inferior to persulfate alone. The difference in behavior in chloride and bromide systems is not understood completely but may relate to the relative ease by which chloride and bromide ions are oxidized to chloride and bromine.

TABLE I

| | | Viscosity of Sodium Chloride Completion Fluid 119 kg/m$^3$ Containing 0.6% HEC | | | | | | | | | |
|---|---|---|---|---|---|---|---|---|---|---|---|
| Run No. | mM Active Oxygen | Additives - grams in 380 ml | | | | | % Viscosity Reduction at (hrs) | | | | |
| | | $H_2O_2$ | APS | Cu | AMP | Sulfite | .5 | 1 | 2 | 3 | 6 |
| 1 | 2.4 | — | .2 | — | — | — | 47 | 53 | 70 | 78 | — |
| 2 | 4.8 | — | .4 | — | — | — | 45 | 58 | 77 | 85 | — |
| 3 | 10.7 | — | .9 | 0.09 | 0.26 | 0.10 | 52 | 73 | — | 93 | 97 |
| 4 | 10.7 | — | .9 | 0.09 | — | — | 51 | 68 | — | 91 | 98 |
| 5 | 5.4 | .07 | — | 0.035 | — | — | 95 | 96 | 96 | 96 | — |
| 6 | 5.4 | .07 | — | — | — | 0.09 | 81 | 88 | 95 | 96 | 96 |
| 7 | 5.4 | .07 | — | — | — | — | 83 | 92 | 96 | 97 | 99 |
| 8 | 10.7 | .14 | — | — | — | — | 99 | 99 | — | — | — |

TABLE I-continued

Viscosity of Sodium Chloride Completion Fluid 119 kg/m³ Containing 0.6% HEC

| Run No. | mM Active Oxygen | Additives - grams in 380 ml | | | | | % Viscosity Reduction at (hrs) | | | | |
|---|---|---|---|---|---|---|---|---|---|---|---|
| | | H₂O₂ | APS | Cu | AMP | Sulfite | .5 | 1 | 2 | 3 | 6 |
| 9 | 7.8 | .07 | .2 | — | — | — | 97 | 99 | 98 | — | — |
| 10 | 4.6 | .035 | .1 | — | — | — | 97 | 98 | 98 | — | — |

TABLE II

Viscosity of Calcium Chloride Completion Fluid 139 kg/m³ Containing 0.6% HEC

| Run No. | mM Active Oxygen | Additives - grams in 380 ml | | | | | % Viscosity Reduction at (hrs) | | | | |
|---|---|---|---|---|---|---|---|---|---|---|---|
| | | H₂O₂ | APS | Cu | AMP | Sulfite | .5 | 1 | 2 | 3 | 6 |
| 11 | 4.8 | — | 0.4 | — | — | — | 41 | 68 | — | 93 | 98 |
| 12 | 4.8 | — | 0.4 | 0.044 | 0.11 | 0.10 | 87 | 93 | — | 98 | 99 |
| 13 | 10.7 | — | 0.9 | 0.09 | 0.26 | 0.10 | 90 | 95 | — | 98 | 99 |
| 14 | 5.4 | 0.07 | — | — | — | — | 64 | 82 | 84 | 85 | 87 |
| 15 | 7.8 | 0.07 | 0.2 | — | — | — | 98 | 99 | 100 | — | — |
| 16 | 2.3 | 0.03 | — | — | — | — | 3 | 50 | 51 | 53 | — |
| 17 | 4.6 | 0.06 | — | — | — | — | 33 | 58 | 59 | 59 | — |
| 18 | 1.2 | — | 0.1 | — | — | — | 0 | 3 | 7 | 13 | — |
| 19 | 2.4 | — | 0.2 | — | — | — | 0 | 3 | 9 | 17 | — |
| 20 | 3.5 | 0.3 | 0.1 | — | — | — | 48 | 89 | 90 | 91 | — |

TABLE III

Viscosity of Sodium Bromide Completion Fluid 132 kg/m³ Containing 0.6% HEC

| Run No. | mM Active Oxygen | Additives - grams in 380 ml | | % Viscosity Reduction at (hrs) | | | | |
|---|---|---|---|---|---|---|---|---|
| | | H₂O₂ | APS | .5 | 1 | 2 | 3 | 6 |
| 21 | 4.8 | — | .40 | 34 | 57 | — | 89 | 96 |
| 22 | 5.4 | .07 | — | 15 | 19 | 28 | 30 | 33 |
| 23 | 7.8 | .07 | .20 | 10 | 20 | 26 | 28 | 30 |

TABLE IV

Reuse of Brines

| | Viscosity | | |
|---|---|---|---|
| | Original | Rethickened Immediate | Rethickened After 16 hours |
| Sodium Chloride Viscometer Pa · S Rheometer | 0.240 | 0.312 | 0.432 |
| 600 rpm-Units | 55 | 89 | 100 |
| 300 rpm-Units | 39 | 65 | 72 |
| Calcium Chloride Viscometer Pa · S Rheometer | 0.620 | 0.522 | 0.438 |
| 600 rpm-Units | 110 | 107 | 107 |
| 300 rpm-Units | 81 | 76 | 76 |

1 Rheometer Unit = 0.0488 kg/m²

What is claimed is:

1. A method to liquify a chloride-based heavy brine completion fluid having a density greater than about 90 kg/m³ consisting essentially of incorporating into the completion fluid a sufficient amount of hydrogen peroxide and of a persulfate so that the hydrogen peroxide:persulfate mol ratio is between 9:1 and 1:9 and the combined hydrogen peroxide and persulfate content of the completion fluid is at least 1 millimol per liter, thereby liquifying the completion fluid absent added acceleration agents.

2. A method to liquify a chloride-based heavy brine completion fluid having a density greater than about 90 kg/m³ consisting essentially of incorporating into the completion fluid a sufficient amount of hydrogen peroxide and of a persulfate selected from the group consisting of ammounium persulfate, potammium persulfate, and sodium persulfate, so that the hydrogen peroxide:persulfate mol ration is between 9:1 and 1:9 and the combined hydrogen peroxide and persulfate content of the completion fluid is at least 1 millimol per liter, thereby liquifying the completion fluid absent added accelerating agents.

3. The method of claim 1 wherein the hydrogen peroxide is generated within the completion fluid from a compound selected from the group consisting of sodium perborate, sodium carbonate peroxide, sodium pyrophosphate peroxide, sodium peroxide, and urea peroxide.

4. The method of claim 1 wherein the persulfate is an alkali metal persulfate or ammonium persulfate.

5. The method of claim 4 wherein the hydrogen peroxide is generated within the completion fluid by introducing oxygen gas into the completion fluid and passing an electric current between an anode and a cathode immersed in the completion fluid, thereby reducing the oxygen to hydrogen peroxide at the cathode.

6. The method of claim 2 wherein the hydrogen peroxide:persulfate mol ratio is between 9:1 and 1:1.

* * * * *

UNITED STATES PATENT AND TRADEMARK OFFICE
CERTIFICATE OF CORRECTION

PATENT NO. : 4,594,170

DATED : June 10, 1986

INVENTOR(S) : Richard A. Brown, Robert D. Norris and Joseph C. Richards

It is certified that error appears in the above—identified patent and that said Letters Patent is hereby corrected as shown below:

Column 1, line 38, "a" should read --A--; line 38, "solides" should read --solids--; line 39, "Consiequently" should read --Consequently--, line 48, "inhibitors U. S." should read --inhibitors. U. S.---. Column 2, line 23, "recongnize" should read --recognize--; line 26 "copletion" should read --completion--. Column 3, line 18, "eithe" should read --either--. Column 4, line 33, "A moe" should read --A more--; line 36 "(Run 12-13)" should read --(Runs 12-13)--; line 40, "compete" should read --complete--; line 43 "Run 16-20" should read --Runs 16-20--; line 47, "Rund" should read --Runs--. Column 6, line 36, "ammounium" should read --ammonium--; line 36, "potammium" should read --potassium--; line 38, "ration" should read --ratio--.

Signed and Sealed this

Ninth Day of September 1986

[SEAL]

Attest:

DONALD J. QUIGG

Attesting Officer

Commissioner of Patents and Trademarks